April 6, 1926.
W. F. BOUCHÉ
1,579,505
ELECTRICAL SYSTEM
Filed July 29, 1921
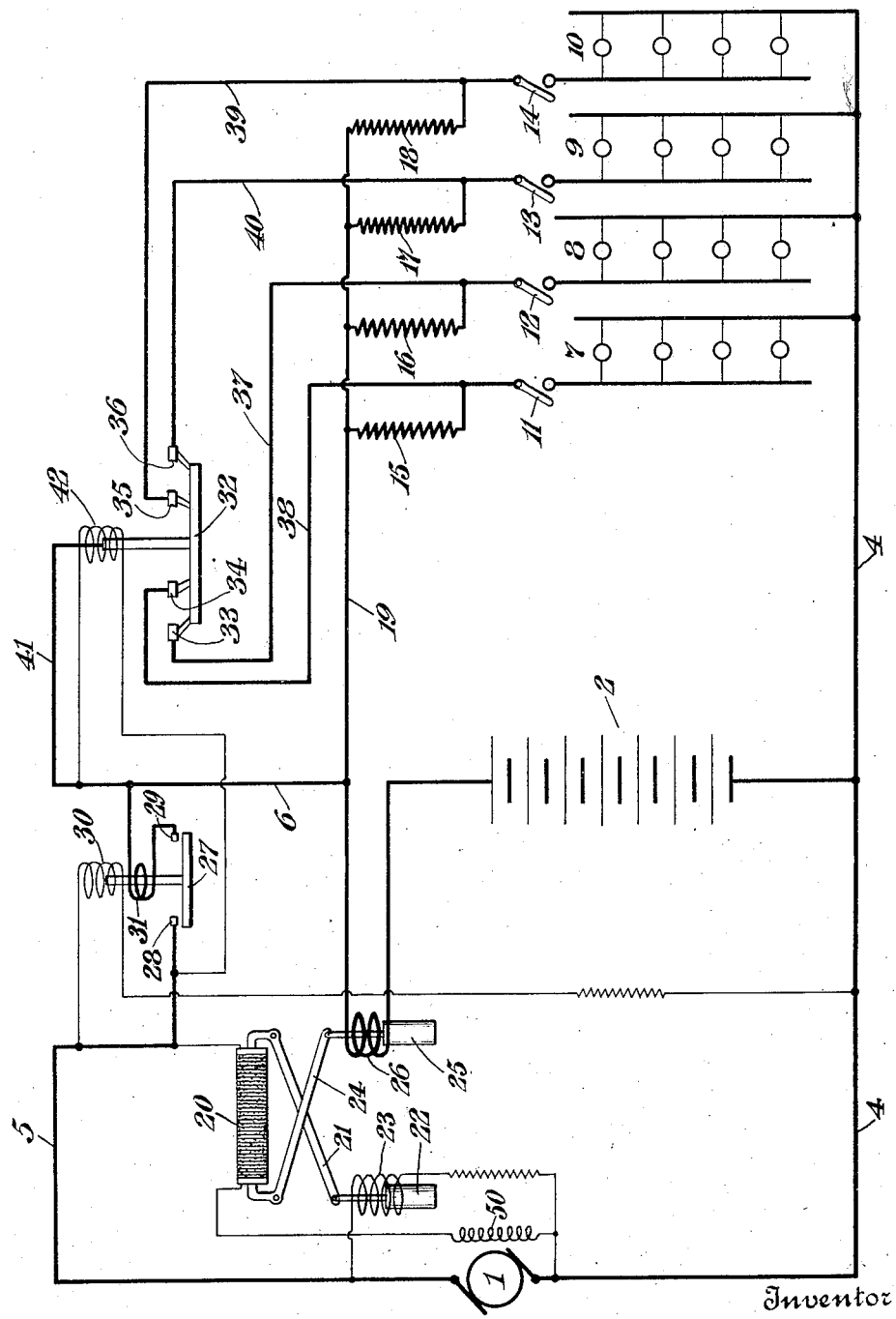
Inventor
William F. Bouché
By his Attorney
Gorham Crosby Patented Apr. 6, 1926.

1,579,505

UNITED STATES PATENT OFFICE.

WILLIAM F. BOUCHÉ, OF LANCASTER, NEW YORK, ASSIGNOR, BY MESNE ASSIGNMENTS, TO THE GOULD COUPLER COMPANY, A CORPORATION OF MARYLAND.

ELECTRICAL SYSTEM.

Application filed July 29, 1921. Serial No. 488,339.

*To all whom it may concern:*

Be it known that I, WILLIAM F. BOUCHÉ, a citizen of the United States, and resident of Lancaster, in the county of Erie and State of New York, have invented certain new and useful Improvements in Electrical Systems, of which the following is a specification.

My invention relates to improvements in electrical systems and more particularly to systems in which a generator is adapted to charge a storage battery and supply a work circuit in parallel with the battery, the battery serving to supply the work circuit when the generator is not running at sufficient speed, or is stopped. In such a system the voltage of the generator required to charge the battery is higher than the discharge voltage of the battery when the generator is disconnected and the battery supplies the work circuit, and therefore it is desirable to provide some means whereby such variation in voltage will not fall upon the work circuit. One object of the present invention is to provide an improved arrangement for this purpose, and also one in which provision is made for the quick pickup of the generator when it is started up. Further and more specific objects, features and advantages will more clearly appear from the detail description given below, taken in connection with the accompanying drawing which forms a part of this specification. The drawing illustrates diagrammatically a system embodying my improvements in a preferred form thereof.

The system illustrated in the drawing is one particularly adapted for the lighting of railway cars in which the generator is driven at variable speed from the car axle and a storage battery is charged thereby, which battery is adapted to supply the lights of the work circuit or circuits when the generator is not running at sufficient speed or the car is stopped. It will be clear, however, that the improvements are adapted to many other forms of systems in which a generator is adapted to charge or supply a battery in parallel with a work circuit or work circuits, the battery serving to supply the work circuit or circuits when the generator is not running at sufficient speed.

Referring to the drawing, 1 represents a generator driven at variable speed from the car axle and 2 a storage battery connected to be charged thereby through the conductors 4, 5 and 6. 7, 8, 9 and 10 represent four light or work circuits one side of each of which is connected to the main 4 and the other sides of which are connected to the conductor 6 through switches 11, 12, 13 and 14 respectively, and fixed resistances 15, 16, 17 and 18 respectively and conductor 19, so that the work circuits are also connected to be supplied from the generator in parallel with the battery, the resistances 15, 16, 17 and 18 being in series with the respective work circuits in order that the voltage applied to the work circuits will be somewhat less than the voltage which the generator applies to the battery.

While any suitable arrangement may be used for regulating the voltage of the generator, I have shown means comprising a carbon pile 20 of well known construction, and operated upon on one end by a lever 21, to which is connected a solenoid core adapted to be raised by a solenoid 23 connected across the generator so as to be responsive to voltage variations across the generator. The other end of the carbon pile 20 is operated upon by lever 24 which has connected thereto a solenoid core 25 adapted to be raised by a solenoid 26 connected in series with the battery 2. 50 represents the shunt field of the generator, and carbon pile 20 is connected in series with the shunt field 50. When the generator is running at variable speed, if its voltage increases so as to tend to send too great a current into the battery, the solenoid 26 operates to release the pressure on the carbon pile 20 and so increase the resistance in series with the shunt field 50 and maintain the voltage of the generator at such a value as to prevent too great a current flowing in the battery. If the voltage of the generator tends to exceed a pre-determined value solenoid 23 will operate to release the pressure on the other end of the carbon pile and so increase the resistance in the field circuit as to limit the voltage of the generator substantially to said pre-determined value, and in this way the charging current of the battery during part of the charging period is suitably limited and during the latter part of the charging period the voltage of the generator is so limited as to decrease the charging current as desired.

Connected in the conductor 5 is a main switch 27 adapted to connect the main switch contacts 28 and 29. In starting up, when the generator gets up to the desired speed as indicated by the voltage across its terminals, the solenoid coil 30 acts to close the switch 27 and connect the generator to supply the battery and work circuits. The solenoid operating the switch 27 is also provided with a coil 31 in series in the conductor 5 so that when the speed of the generator decreases to such an extent that its voltage is below that of the discharge voltage of the battery, the current will flow through from the battery back through the generator and coil 31 will oppose coil 30 and cause a prompt and sure opening of the switch 27 to disconnect the generator from the battery and work circuits.

When the generator is thus disconnected the battery 2 will supply the work circuits and in order that the lower voltage of the battery under such conditions may not produce a variation in voltage across the lamp circuits, means are provided for shunting out the resistances 15, 16, 17 and 18, such means comprising a switch 32 having flexible contact fingers adapted to make contact with the contacts 33, 34, 35 and 36, which contacts are connected directly to the switches 12, 11, 14 and 13 respectively by conductors 37, 38, 39 and 40 respectively. The switch itself is connected with the conductor 6 by a conductor 41 so that upon closing the switch 32 the resistances 15, 16, 17 and 18 which are normally in series with the work circuits 7, 8, 9 and 10 respectively, are shunted out and the battery is connected directly to such work circuits. By dividing the load up into a plurality of work circuits each with its own fixed resistance in series therewith, more satisfactory operation is obtained when the load varies as by turning on and off more or less of the lamps. 42 represents a solenoid coil connected across the terminals 28 and 29 of the switch 27 so as to be responsive to variations in voltage across said switch. When the switch 27 is closed and the generator is supplying the battery and lamp circuits, the coil 42 is shunted so that the switch 32 opens by gravity and the resistances 15, 16, 17 and 18 are placed in series with the respective work circuits. When, however, the main switch 27 is open and the battery is supplying the lamps, current from the battery will pass through the coil 42 and through the generator, causing the coil 42 to be energized so that it will operate the switch 32 and close the same to shunt out the resistances 15, 16, 17 and 18. By thus connecting the coil 42 it not only serves to efficiently control the opening and closing of the switch 32, but also being a high resistance coil, it serves to permit a small current from the battery to pass through the generator brushes and field, when the generator is at rest, thus insuring a rapid and satisfactory building up of the generator when it is again started up. That is, the coil 42 serves a two-fold purpose in that it not only controls the shunting out of the resistances in series with the lamp circuits when switch 27 is open, but it also serves as a resistance element connected across the switch 27 to permit a small current from the battery to flow through the generator when it is running below critical speed or is at rest, in order to insure satisfactory pickup of the generator when it is again started up.

While I have described the invention in great detail and with respect to a preferred embodiment thereof, I do not desire to be limited to such details or embodiment since many changes and modifications may be made and the invention embodied in widely different forms without departing from the spirit and scope thereof in its broader aspects as defined in the appended claims.

What I claim is new and desire to secure by Letters Patent, is:

1. An electrical system having a generator, a storage battery and a plurality of work circuits connected to be supplied from the generator in parallel, a fixed resistance in series in each work circuit respectively, a switch for short circuiting said resistances, a coil for electromagnetically closing said switch to short circuit said resistances and an electro-responsively operated switch for connecting and disconnecting the generator from the battery and work circuits, said coil being connected across said last mentioned switch, whereby it is energized when the last mentioned switch is open and serves to permit the battery to supply current to the generator when said last mentioned switch is open.

2. An electrical system having in combination a generator, a storage battery and work circuit connected to be supplied by the generator in parallel, an electro-responsively operated switch for connecting and disconnecting the generator from the battery and work circuit, a fixed resistance in series with the work circuit, a switch for short circuiting said fixed resistance, a coil for causing said last switch to short circuit said resistance, said coil being connected across said first switch whereby when said first switch is open the coil is energized to close the second switch and also permit the battery to supply current to the generator, and said second switch being held closed by the electro-magnetic force of said coil and a switch in the work circuit for disconnecting the work circuit from the battery and generator without affecting said coil when the first switch is open.

3. An electrical system having in combination a generator, a storage battery and a plurality of work circuits connected to be supplied from the generator in parallel, an electro-responsively operated switch for connecting and disconnecting the generator from the battery and work circuits, a plurality of fixed resistances in series with the work circuits respectively, means for short circuiting said resistances, and a coil controlling said short circuiting means, said coil being connected across said switch whereby when the switch is open the coil is energized to cause the resistances to be short circuited and also permit the battery to supply current to the generator.

4. An electrical system having in combination a generator, a storage battery and a plurality of work circuits connected to be supplied from the generator in parallel, an electro-responsively operated switch for connecting and disconnecting the generator from the battery and work circuits, a plurality of fixed resistances in series with the work circuits respectively, means for short circuiting said resistances and a coil controlling the short circuiting of all of said resistances, said coil being connected to be responsive to the opening and closing of said switch, whereby when the switch is open the resistances are short circuited.

5. An electrical system having in combination a generator, a storage battery and a plurality of work circuits connected to be supplied from the generator in parallel, an electro-responsively operated switch for connecting and disconnecting the generator from the battery and work circuits, a plurality of fixed resistances in series with the work circuits respectively, a single switching element for short circuiting all of said resistances, and a coil which when energized holds said switching element in position to short circuit said resistances, said coil being energized responsive to the opening of said first mentioned switch.

6. An electrical system having in combination a generator, a storage battery and a plurality of work circuits connected to be supplied from the generator in parallel, an electro-responsively operated switch for connecting and disconnecting the generator from the battery and work circuits, a plurality of fixed resistances in series with the work circuits respectively, a single switching element for short circuiting all of said resistances, and electro-responsive means for controlling said switching element responsive to the opening and closing of the first mentioned switch.

Signed at Depew in the county of Erie and State of New York this 27th day of July A. D. 1921.

WILLIAM F. BOUCHÉ.